United States Patent [19]

Kearney et al.

[11] Patent Number: 4,990,259
[45] Date of Patent: Feb. 5, 1991

[54] CHROMATOGRAPHIC SEPARATOR SORBENT BED PREPARATION

[75] Inventors: Michael M. Kearney, Twin Falls; Michael W. Mumm, Hansen, both of Id.

[73] Assignee: The Amalgamated Sugar Company, Ogden, Utah

[21] Appl. No.: 412,417

[22] Filed: Sep. 26, 1989

Related U.S. Application Data

[63] Continuation-in-part of Ser. No. 285,717, Dec. 16, 1988, abandoned.

[51] Int. Cl.⁵ .................................................. B01D 15/08
[52] U.S. Cl. ..................................... 210/659; 210/635; 210/670; 210/673; 210/198.2; 127/46.1; 127/46.2; 141/12; 141/73; 141/80
[58] Field of Search ............... 210/659, 635, 662, 656, 210/670, 673, 143, 96.1, 137, 198.2, 264; 127/46.1, 46.2; 141/12, 73, 80

[56] References Cited

U.S. PATENT DOCUMENTS

| | | | |
|---|---|---|---|
| 2,985,589 | 5/1961 | Broughton et al. | 210/676 |
| 3,268,605 | 8/1966 | Boyd | 210/662 |
| 3,831,755 | 8/1974 | Goodman et al. | 210/108 |
| 3,956,113 | 5/1976 | Brenner | 210/644 |
| 4,001,113 | 1/1977 | Schoenrock et al. | 210/678 |
| 4,017,358 | 4/1977 | Van der Schoot | 210/683 |
| 4,182,633 | 1/1980 | Ishikawa et al. | 127/46.2 |
| 4,247,636 | 1/1981 | Schoenrock et al. | 435/94 |
| 4,366,060 | 12/1982 | Leiser et al. | 210/635 |
| 4,379,751 | 4/1983 | Yoritomi | 210/659 |
| 4,392,980 | 7/1983 | Lee | 210/667 |
| 4,400,278 | 8/1983 | Martinola | 210/275 |
| 4,402,832 | 9/1983 | Gerhold | 210/659 |
| 4,412,866 | 11/1983 | Schoenrock et al. | 127/46.2 |
| 4,422,942 | 12/1983 | Allington | 210/659 |
| 4,478,721 | 10/1984 | Gerhold | 210/659 |
| 4,498,991 | 2/1985 | Oroskar | 210/659 |
| 4,501,814 | 2/1985 | Schoenrock et al. | 435/94 |
| 4,511,476 | 4/1985 | Schoenrock | 210/678 |
| 4,673,507 | 6/1987 | Brown | 210/681 |
| 4,724,081 | 2/1988 | Kawahara | 210/198.2 |
| 4,840,730 | 6/1989 | Saxena | 210/659 |

Primary Examiner—Ernest G. Therkorn
Attorney, Agent, or Firm—Trask, Britt & Rossa

[57] ABSTRACT

An equilibrated percent solids waveform is established in a simulated moving bed process. A contraction phase of the waveform is monitored as it rotates through a circulation loop including a plurality of resin bed compartments. The contraction phase is followed by a desorbent phase. A slurry of resin is added to each compartment between the contraction and desorbent phases.

6 Claims, 5 Drawing Sheets

CHROMATOGRAPHIC SEPARATOR SORBENT BED PREPARATION

RELATED APPLICATIONS

This application is a continuation-in-part of commonly assigned, U.S. patent application Ser. No. 285,717, filed Dec. 16, 1986, now abandoned. The parent application disclosed a packing technique used for chromatographic separator systems generally. This application is directed to a specific modification of that technique applied to a simulated moving bed process.

BACKGROUND OF THE INVENTION

1. Field

This invention relates to an improvement in the preparation of the sorbent beds of a simulated moving bed chromatographic separator. It is particularly directed to a sorbent bed packing technique which reduces void volume and improves the separation characteristics of a simulated moving bed.

2. State of the Art

Batch, continuous or simulated moving bed systems designed for the chromatographic separation of mixture components often consist of one or more beds of solid separator medium (sorbent). Proper preparation of the sorbent bed(s) is an important factor, and determines in part the separating efficiency of the chromatographic device.

It is generally understood that a sorbent bed should be prepared in such a manner that no large voids exist in the compartment containing the sorbent. This preparation minimizes mixing inside the compartment and improves even plug flow across the compartment cross-section. It is also recognized that an increase in sorbent bed density can improve the separating efficiency of the sorbent bed.

Preparation procedures which have been practiced include:

(1) "Slurry" or "dry" packing, in which the sorbent is pumped or drawn into the bed compartment at atmospheric pressure.

(2) "Slurry" packing, in which sorbent is mixed with a solvent and the slurry is pumped into the compartment under pressures greater than that to be applied in the subsequent separation procedure.

(3) "Slurry" or "dry" sorbent packing followed by vibration of the sorbent compartment more densely to pack the sorbent.

(4) Axial or radial compression systems which mechanically pack the sorbent.

(5) Any of the procedures (1), (2), (3) or (4), followed by contacting the bed with flowing liquid at high pressure to compress the sorbent bed, thereby to create a void in the bed, and thereafter filling the resultant void with additional sorbent.

(6) Packing methods which involve shrinking the sorbent and then expanding it in some manner so that the sorbent is packed throughout the compartment. For example, U.S. Pat. No. 4,336,060 describes a method in which a resin is contracted with a salt solution and is then transferred in the shrunken state to a separation column. The loaded resin completely fills the column. The confined resin is then washed with water to remove unbound salt. The resin then expands, creating a positive expansion pressure within the separator column. U.S. Pat. No. 4,673,507 discloses a similar process for ion exchange type applications.

Sorbent bed systems representative of the types contemplated by this invention are disclosed in U.S. Pat. Nos. 2,985,589; 3,831,755; 4,400,278; 4,404,037; 4,011,113; 4,182,633; 4,247,636; 4,412 866; 4,501,814 and 4,511,476, the disclosures of which are incorporated by reference for their teachings concerning sorbent beds generally and the use of such beds in industrial scale operations. U.S. Pat. 4,511,476 is specifically instructive concerning the mechanical manipulation of such beds. The disclosures of U.S. Pat. Nos. 4,366,060 and 4,673,507 are incorporated by reference for their disclosures concerning techniques for shrinking and expanding resins useful for sorbent beds.

Simulated moving bed (SMB) technology is well developed for applications involving separating the components of a fluid. Typical applications of simulated moving bed chromatography include the separation of fructose from fructose-glucose solutions and the separation of sucrose from sugar beet or sugar cane syrups. Ion exchange resins are typically employed as sorbents for these applications. Solution components are differentially absorbed by the ion exchange resin so that a separation waveform develops within the simulated moving bed.

A typical simulated moving bed apparatus consists of several compartments (or individual columns) filled with solid sorbent. A fluid conduit interconnects the upstream and downstream ends of the system to form a loop through which fluid is continuously recirculated. The constant flow of fluid through the loop is called "internal recirculation flow." A manifold system of pipes and valves is provided selectively to position an inlet for feed material, an inlet for desorbent, an outlet for a sorbed component and an outlet for a nonsorbed (or less sorbed) component. Each inlet and outlet communicates with a separate bed compartment. Feed material enters the system at a designated compartment and is moved through the sorbent by the continuous internal recirculation flow. This moving contact results in a chromatographic separation of components. Sorbed component(s) which flow(s) at a relatively slow rate is removed from the sorbed component outlet. Nonsorbed component(s) which flow(s) at a relatively fast rate is removed from the nonsorbed component outlet. Desorbent is added at its inlet valve between the respective outlet valve positions of the sorbed and nonsorbed components.

At predetermined time intervals (step time) the designated inlet and outlet valve positions are displaced downstream one position on the manifold to the next sorbent bed compartment, which may be a discrete section of a vessel, (such as a column), or an individual such vessel, e.g., column. The step time is chosen such that the designation of valves is properly synchronized with the internal recirculation flow. Under these conditions the system eventually reaches a steady state with specific product characteristics appearing at predetermined intervals in sequence at each valve position. This type of system simulates valves held in a single position while the solid sorbent moves at a constant and continuous rate around the recirculation loop producing constant quality product at each valve.

The simulated version more closely approaches the character of an actual moving bed system as the number of compartments and valve positions increase. An important distinction between batch and simulated moving bed systems is that the internal recirculation flow is continuous in the simulated moving bed process. Except for very small adjustments to control internal pressure, the entering and exiting flow rates are continuous and constant, thereby approximating an actual moving bed system as closely as possible.

SUMMARY OF THE INVENTION

This invention provides a sorbent bed packing procedure which minimizes sorbent bed compartment void space and provides a sorbent bed of increased density in a chromatographic separator operating on the principle of the simulated moving bed. A resin contraction procedure is employed. Particularly important characteristics of the disclosed process which differentiate it from other processes are:

(1) No special reagents of any kind are required for resin preparation. Accordingly, the costs, equipment and safety concerns normally associated with the requirement for special reagents are avoided. Industrial scale simulated moving bed systems typically include several hundred cubic meters of packing material, inevitably imposing significant costs on procedures which use reagents.

(2) No handling or disposal of used reagents is required. The procedure of this invention creates no waste materials.

(3) Bed preparation is accomplished during the normal production routine As a consequence, interruptions to production or delays during start-up (while beds are prepared) are minimized.

(4) The simulated moving bed may be repacked (for example, after some sorbent settling occurs) at any time without disturbance to the production process.

The present invention involves operating a simulated moving bed consisting of separate columns or compartments. The compartments are filled with a separation medium (sorbent), such as ion exchange resin. The simulated moving bed is operated such that an equilibrated separation waveform develops. The term "equilibrated separation waveform" refers to a steady state condition in which the plot of percent solids of a component versus circulation loop position retains approximately the same shape over time, although the individual points on the plot appear to rotate around the loop over time. The circulating waveform is monitored for the development of a resin contraction phase. The term "resin contraction phase" refers to a fluid composition revealed by the waveform known to interact with the sorbent material to cause shrinkage of that material. The rotation of the contraction phase through the simulating moving bed is also monitored. The equilibrated simulated moving bed system exhibits a steady state separation waveform along the path of the recirculation loop. This waveform rotates around the path of the recirculation loop with valve switching synchronized to maintain the desired steady state.

The formation of a steady state waveform within the simulated moving bed system is important to the practice of this invention. As the contraction phase appears in any single compartment, excess sorbent is pumped or otherwise drawn into the void space created by the contraction. Liquid displaced by the sorbent exits through the compartment distributor and is recovered. Each compartment is packed in this manner as the contraction phase passes through that compartment. The resulting packed compartments exhibit improved separation characteristics due to minimization of void and increased bed density. After long-term operation of the simulated moving bed, settling of the sorbent bed can occur. Additional sorbent can then be added using the same procedure with no disturbance to the production process.

As currently envisioned, the invention is applied to a simulated moving bed process in which a plurality of sorbent beds are contained within separate respective vessels (compartments) with inlets and outlets connected in a loop. Circulating liquid moves in sequence through the beds while process input streams are cyclically introduced in corresponding sequence to the loop at selected locations associated with the vessels. Compensating process outlet streams are withdrawn in similarly corresponding sequence from the loop at other selected locations associated with the vessels. A forward flow is maintained in a fixed direction through the loop during a plurality of cycles.

The invention comprises operating such a simulated moving bed process to establish an equilibrated percent solids waveform whereby a contraction phase continuously moves through the loop; monitoring the position of the contraction phase in the loop over time; and introducing sorbent to a selected sorbent bed following the passage of the contraction phase through the bed while maintaining the forward flow through the loop.

Typically, a discrete contraction phase is followed in the loop by a discrete desorbent phase. The contraction and desorbent phases thus flow in sequence through any particular bed. Sorbent is desirably added during the interval of time between contact of the bed by the respective discrete contraction and desorbent phases. The sorbent is most readily added in slurry form, ideally with the liquid phase of the slurry being similar in composition to the contraction phase. In most instances, the sorbent is added to a bed by introducing sorbent to the top of the compartment containing the bed. As sorbent is added, liquid is displaced from the compartment, usually through a liquid distributor at the top of the compartment.

BRIEF DESCRIPTION OF THE DRAWINGS

In the drawings, which illustrate what is presently regarded as the best mode for carrying out the invention.

DESCRIPTION OF THE ILLUSTRATED EMBODIMENTS

EXAMPLE I

Figure 1:
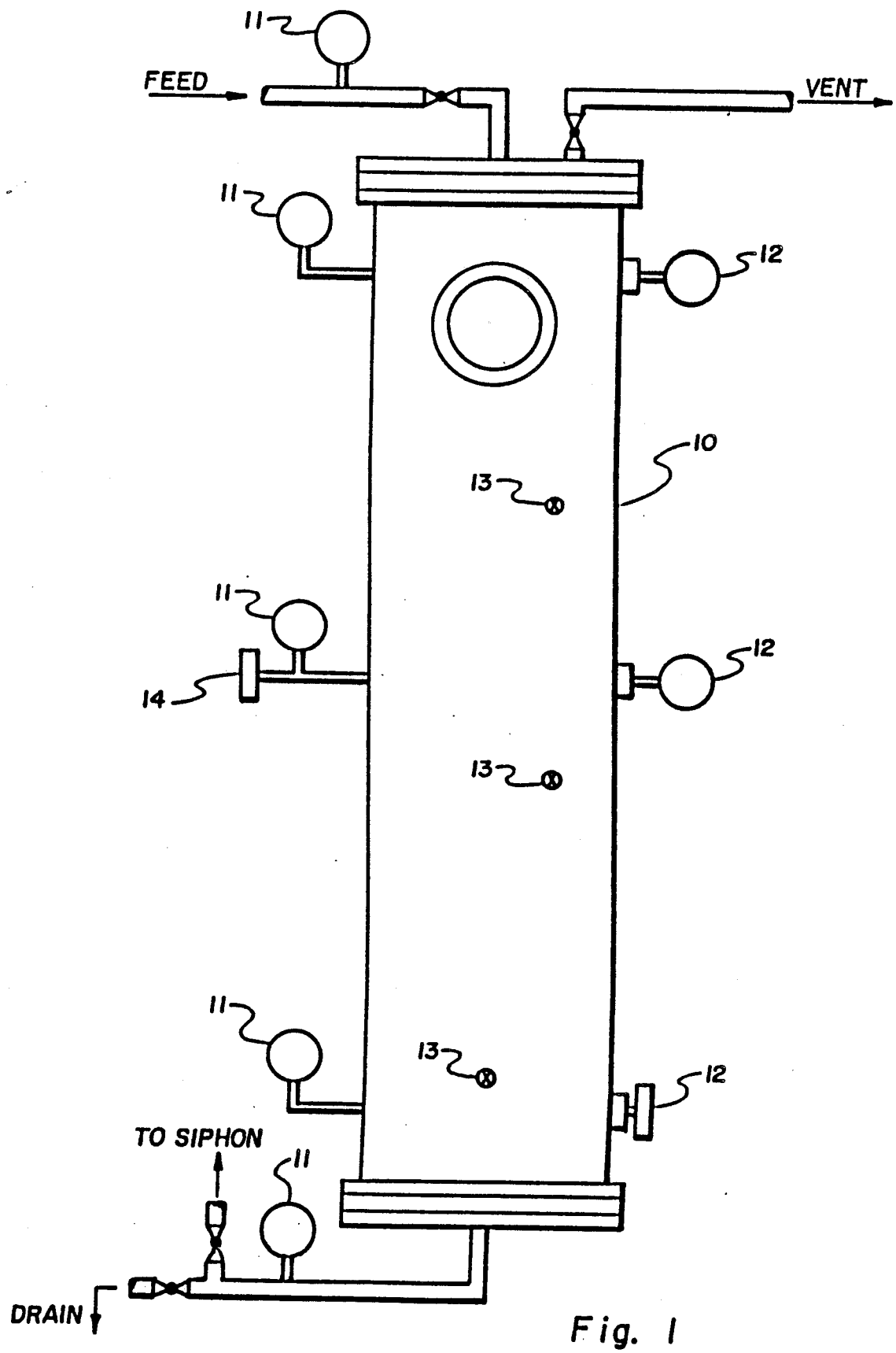
FIG. 1 is a sketch illustrating a model separator cell.

FIG. 1 illustrates a model separator cell 10 which was used for a number of test runs. The cell stood 9 feet tall and had a two foot diameter. It was filled with Dowex 99, a commercially available strong cation resin in potassium form. Three liquid distributors were positioned on the top plate and three liquid collectors were positioned on the bottom plate of the cell. The three collectors at the bottom were covered by several inches of sand to provide a more porous bed, and to protect the collectors from the resin. Liquid pressure gauges 11 were mounted on one side of the cell and diaphragm pressure gauges 12 were mounted directly opposite. Strain gauges 13 were mounted in various places as shown, and they measured the horizontal and vertical strain on the cell at those points The entire cell 10 was insulated to ensure isothermal results, and the cell was operated under a downflow condition. A positive displacement pump (not shown) was used to pump water or syrup at 6-8 gallons per minute (GPM). A positive displacement tubing pump (not shown) was used to pump resin from five gallon buckets. The operating temperature for the tests ranged from 78° C. to 83° C., as measured at temperature sensors 14.

The empty cell was initially filled with water and operated at various pressures to enable the investigators to become familiar with the equipment, and to observe the liquid, diaphragm, and temperature gauges. The liquid and diaphragm pressure gauges displayed the same pressure readings from 0 psi up to 45 psi.

The cell was then filled with resin and it was determined that the cell was free from air pockets. With resin in the cell, the diaphragm gauges read a higher pressure than the liquid gauges. To determine whether the higher diaphragm pressure was due to the resin expansion pressure plus the liquid pressure, or due solely to the mechanical pressure of the resin, the resin was removed to a level two inches below both pressure gauges. A wood dowel was then wedged in place on the diaphragm of the diaphragm gauge, producing an artificial 8 psi reading on the gauge. This artificial reading represented a mechanical pressure, simulating a constant resin expansion. After bolting down the top of the cell, water was pumped downflow and recirculated through the cell. The exit valve was partially closed, forcing the top liquid pressure to rise to 8 psi. The recorded pressures in Table 1 show that a 6-8 psi increase in liquid pressure resulted in a 6-9 psi increase in the diaphragm pressure. The difference between the 17 psi diaphragm pressure and this 6-9 psi increase, which was identical to the liquid pressure increase, is the 8 psi of artificial pressure simulating resin expansion. Thus, the diaphragm pressure reading minus the liquid pressure reading equals the mechanical pressure due to resin expansion.

It was evident that some resin expansion could be caused by heating the cell. A test was done in which the recirculating cool water was gradually heated from 30° C. to 83° C. The cell was in unpacked condition. The results in Table 2 show that as the cell was heated with hot water, the mechanical pressure in the middle of the cell rose 5 psi, and at the bottom it rose 16 psi. The liquid pressure drop across the cell decreased from 3 psi to about 0 psi. It is postulated that once the resin is heated and begins to expand (as evidenced by the readings of the diaphragm gauges), the intersticial space between the resin beads is enlarged, thus reducing the resistance to flow and hence the pressure drop. The resin beads themselves probably become more porous as they are heated, which aids in reducing the liquid pressure drop.

The cell was then filled with resin slurried in water. The cell was heated with recirculating hot water. 40 RDS syrup was pumped through the cell to shrink the resin. The top of the cell was opened and resin shrinkage was observed. The top was then closed, and the resin was rinsed with circulating water. The resin was observed to expand back to its original size This test was designated an "unpacked test." Table 3 shows that the mechanical pressure dropped along the whole column as the 40 RDS syrup was pumped through, indicating resin shrinkage. The liquid pressure drop across the cell increased from 0-6 psi, but visual inspection, after the top of the cell was opened, revealed very little resin shrinkage, about ⅜". When the 40 RDS syrup was pumped through, the observed increase in the liquid pressure drop across the cell was apparently due to the 40 RDS syrup having a higher liquid viscosity, a slightly less permeable resin bead because of sugar adsorption, and the smaller resin having achieved a smaller void space between beads. When the cell was rinsed with water, the mechanical pressure rose to the value observed before syrup introduction ("sweetening-on"), and the liquid pressure drop across the cell deceased to its original value, indicating resin expansion.

Under "packed condition," the cell was again heated with recirculating hot water, but 60 RDS syrup was used to shrink the resin. After the 60 RDS syrup had recirculated through the cell, the top was opened to observe the resin shrinkage. On several occasions the resin was observed to have shrunk 3"-4" (3-4% of total volume). Then an additional 24 to 26 liters of resin was added to the cell, the top closed, and the cell rinsed off with water.

Because the cell was packed with resin, higher mechanical pressures were expected when rinsing off, due to resin expansion in the water phase. Table 4 shows a similar drop in mechanical pressure as in the unpacked tests after "sweetening-on." After more resin was packed into the cell, the cell was rinsed with water and the mechanical pressure rose as expected. The mechanical pressure rose to approximately the starting pressure, which suggests that the cell was not packed very tightly. It is believed that as the resin expanded, the additional resin that was placed in the cell was able to shift, displacing its volume throughout the cell. This shifting may have imparted a very small effect capable of being sensed by the diaphragm gauges. The liquid pressure drop across the cell shows similar results as in the unpacked test, except when the 60 RDS syrup was used, a much greater pressure drop was observed.

One of the "packed test" runs was notable. During Run #10, the cell was heated and the resin was shrunk with 60 RDS syrup as before. Efforts were made to pump the resin into the bottom or the middle to fill the cell, but were unsuccessful. The resin was successfully pumped into the cell at the top, without removing the top plate of the cell, which simulates an actual factory operation. In previous tests, as the resin-water mixture was pumped into the cell, the centrifugal type screen, mounted on the pipe leading to the air relief valve, kept the resin in the cell while the water exited through the air relief valve. Using this method, 24-26 liters of resin was packed into the cell, but this method eventually resulted in 20-30 psi of pressure. The cell was then filled with the resin-water mixture and the water was allowed to exit through the distributors at the top. When this was done, 30 liters of resin was packed into the cell with less than 5 psi of operating pressure.

The results of Run #10, reported in Table 5, show that the mechanical pressure developed was similar to that of previous tests, except that when the cell was rinsed with water 25 psi mechanical pressure was measured at the bottom of the cell. The liquid pressure drop across the cell was only 0–1 psi. It is believed that the cell may have been in a more packed condition in Run #10 than was the case in the earlier runs. The high mechanical pressure occurred at the bottom only and this pressure dissipated under isothermal conditions.

This example shows that it is feasible to shrink the resin and pack the separator cells. The resin packing operation should be done such that the resin-water mixture enters the top of the cell with the water exiting through the top distributors. It is possible to identify when the cell is full of resin by the sharp rise in observable liquid pressure. It is preferable to repeat the resin shrinkage/packing operation, e.g., 2–3 times, to ensure a packed cell. It is significant that when the cell is rinsed with water, the most likely place for the development of high mechanical pressure, due to resin expansion, is in the bottom of the cell. The cell under packed conditions showed no evidence of an unusually high liquid pressure drop across the cell. It is feasible to shrink the resin with filtered 60 RDS sugar solution. Diaphragm gauges alone may not indicate that the resin has indeed shrunk. There were no distributor/collector plugging problems, either in the packed or unpacked cell condition. Tests the cell. Because heat alone has an effect on resin expansion, it is preferred to pack the cells under cooler conditions (e.g., 30°–40° C.) if possible to ensure a packed cell at higher temperatures (e.g., 80° C.).

TABLE 1

| LIQUID GAUGE/DIAPHRAGM GAUGE PRESSURE TEST | | |
|---|---|---|
|  | Top Liquid psi | Top Diaphragm psi |
| With top off | 0 | 8 |
| After 20 min. recirculation | 0–2 | 11 |
| Exit valve partially closed | 8 | 17 |

TABLE 2

| CELL HEATING TEST | | | | |
|---|---|---|---|---|
|  |  |  | Mechanical Pressure | |
|  | 30° C. | 83° C. | 30° C. | 83° C. |
| Top diaphragm psi | — | — | — | — |
| Top liquid psi | 8 | 3 |  |  |
| Mid diaphragm psi | 8 | 11 | 2 | 7 |
| Mid liquid psi | 6 | 4 |  |  |
| Bottom diaphragm psi | 9 | 20 | 4 | 16 |
| Bottom liquid psi | 5 | 4 |  |  |

TABLE 3

| AVERAGE PRESSURES UNPACKED CONDITIONS | | | | | | |
|---|---|---|---|---|---|---|
|  |  | Pumping |  | Mechanical Pressures | | |
|  | Heating Cell | 40 RDS syrup | Rinse | Heating Cell | Pumping 40 RDS syrup | Rinse |
| Top diaph. psi | 10 | 15 | 8 | 6 | 3 | 4 |
| Top liq. psi | 4 | 12 | 4 |  |  |  |
| Mid diaph. psi | 15 | 16 | 13 | 10 | 7 | 8 |
| Mid liq. psi | 5 | 9 | 5 |  |  |  |
| Bottom diaph.psi | 16 | 12 | 17 | 12 | 6 | 12 |
| Bottom liquid psi | 4 | 6 | 4 |  |  |  |

TABLE 4

| AVERAGE PRESSURES PACKED CONDITIONS | | | | | | |
|---|---|---|---|---|---|---|
|  |  | Pumping |  | Mechanical Pressures | | |
|  | Heating Cell | 60 RDS syrup | Rinse | Heating Cell | Pumping 60 RDS syrup | Rinse |
| Top diaph. psi | 10 | 27 | 9 | 6 | 3 | 5 |
| Top liq. psi | 4 | 24 | 4 |  |  |  |
| Mid diaph. psi | 13 | 25 | 13 | 9 | 7 | 8 |
| Mid liq. psi | 4 | 18 | 5 |  |  |  |
| Bottom diaph. psi | 18 | 15 | 17 | 4 | 7 | 13 |
| Bottom liquid psi | 4 | 6 | 4 |  |  |  |

TABLE 5

Figure 2:
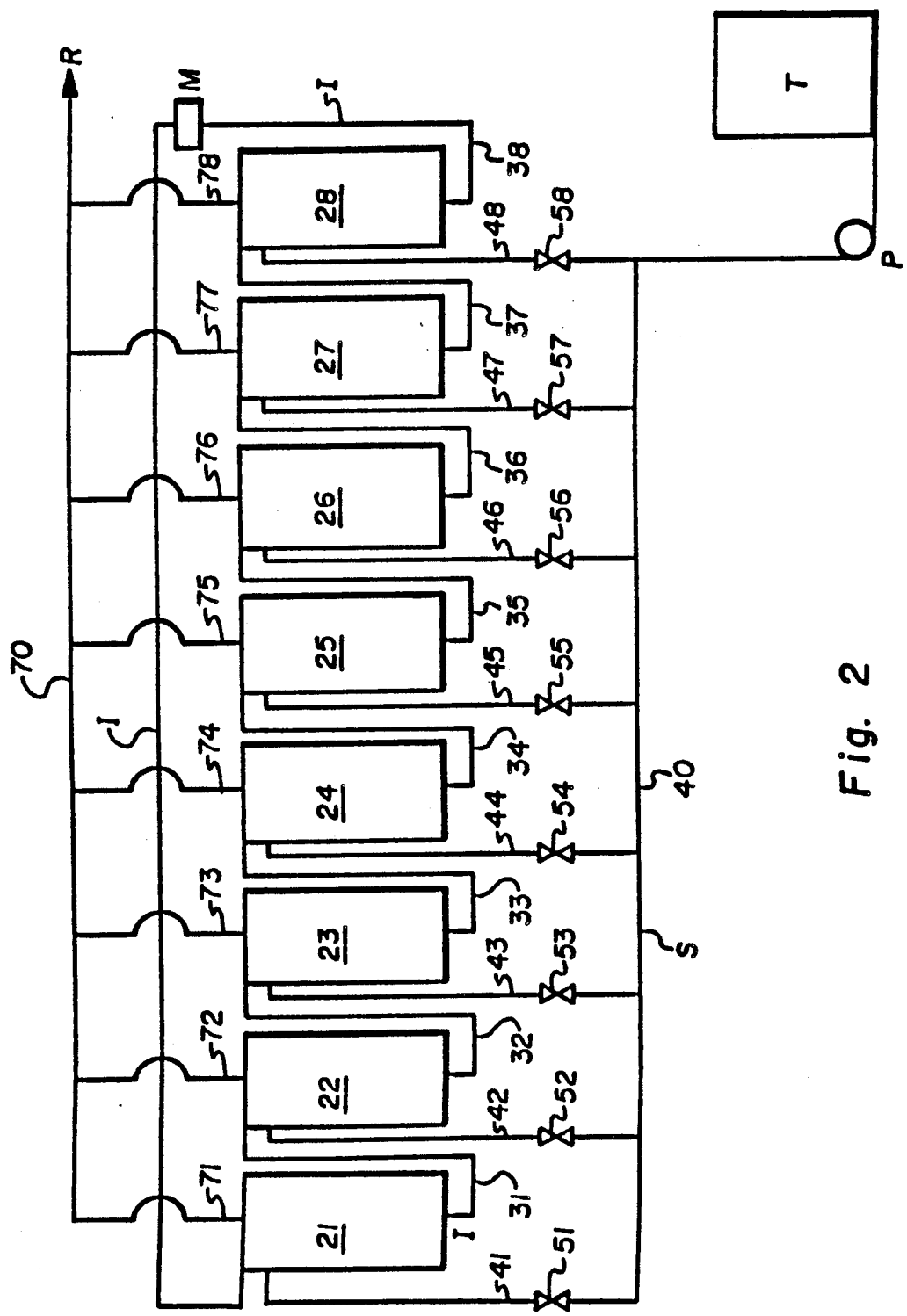
FIG. 2 is a block diagram illustrating a typical arrangement of individual bed compartments and manifold system comprising a simulated moving bed process utilizing this invention.

| RESULTS OF RUN #10 | | | | | | |
|---|---|---|---|---|---|---|
|  |  | Pumping |  | Mechanical Pressures | | |
|  | Heating Cell | 60 RDS syrup | Rinse | Heating Cell | Pumping 60 RDS syrup | Rinse |
| Top diaph. psi | 10 | 27 | 9 | 7 | 4 | 4 |
| Top liq. psi | 3 | 23 | 5 |  |  |  |
| Mid diaph. psi | 13 | 23 | 15 | 9 | 5 | 10 |
| Mid liq. psi | 4 | 18 | 5 |  |  |  |
| Bottom diaph. psi | 20 | 18 | 29 | 16 | 12 | 25 |
| Bottom liquid psi | 4 | 6 | 4 |  |  |  | were done with backwashing the resin in the cell, which allows the resin to intimately contact the distributors at the top, and still no plugging problems occurred. It is important to coat the inside of each cell to protect the resin from fouling and discoloration. There was no evidence of resin damage in the short term by packing FIG. 2 illustrates a typical embodiment of this invention. The simulated moving bed illustrated includes eight individual compartments, designated 21 through 28, respectively. Internal recirculating flow is established through the loop I including the compartments 21 through device M is provided in the loop I for monitoring the concentration of components in the recirculating flow. Typical monitoring instruments M include refractometers, conductivity meters or polarimeters. A sorbent pathway S, comprising pipes 40 through 48 and valves 51 through 58, is used to pack the compartments 21 through 28. A packing sorbent tank T communicates with the sorbent pathway S through an appropriate sorbent pump P. A pathway R for displaced liquid destined for a recovery tank (not shown) comprises piping 70 through 78.

Individual compartments 21-28 may be partially packed by providing sight glasses (not shown) on each cell so that resin levels can be adjusted manually. Sight glasses also aid monitoring of the circulating contraction phase. Complete packing of created void can be accomplished by providing pressure gauges (not shown) near the top plate of the compartments and pumping resin into the created void until a positive mechanical pressure develops within the compartment as indicated by the gauges.

Example II

The following procedure may be used to pack the individual compartments of a simulated moving bed process.

(1) A strong cation exchange resin in monovalent form is loaded to completely fill the chromatographic separator compartments 21-28.

(2) A solution of sucrose, (typically containing about 40 to about 60 percent by weight solids), is pumped downflow at 80° C. and at 3 bed volumes per hour. The resulting void volume due to shrinkage of the resin is about 7 percent.

(3) Void volume containing the sucrose solution is displaced by pumping resin into the created voids. Liquid is removed via a valve located at the top of each compartment. The compartment is thus packed with resin.

(4) A solution of de-ionized water at 80° C. is pumped downflow at 3 bed volumes per hour to displace the sucrose solution and also cause the resin to expand to its original size. A dense bed of resin with minimal void volume results.

Figure 3:
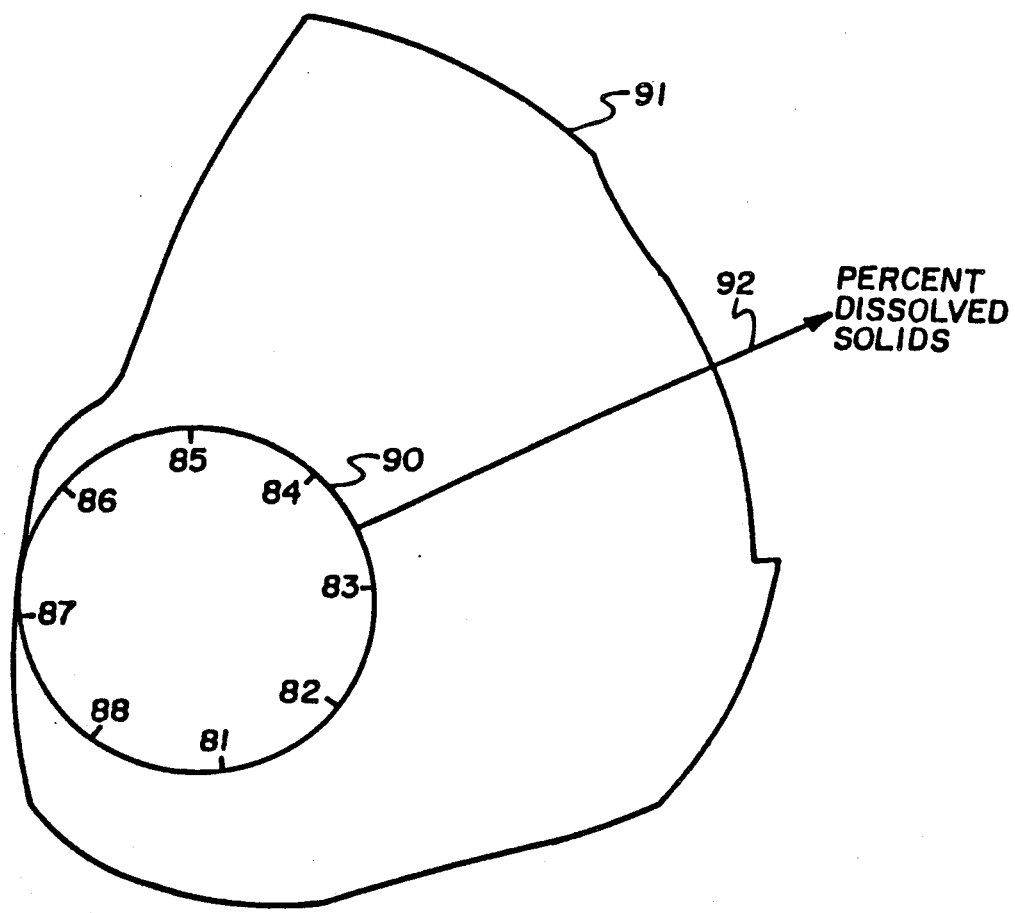
FIG. 3 is a diagrammatic illustration of a percent dry substance waveform typical of a simulated moving bed process in which the invention is applicable.
Figure 4:
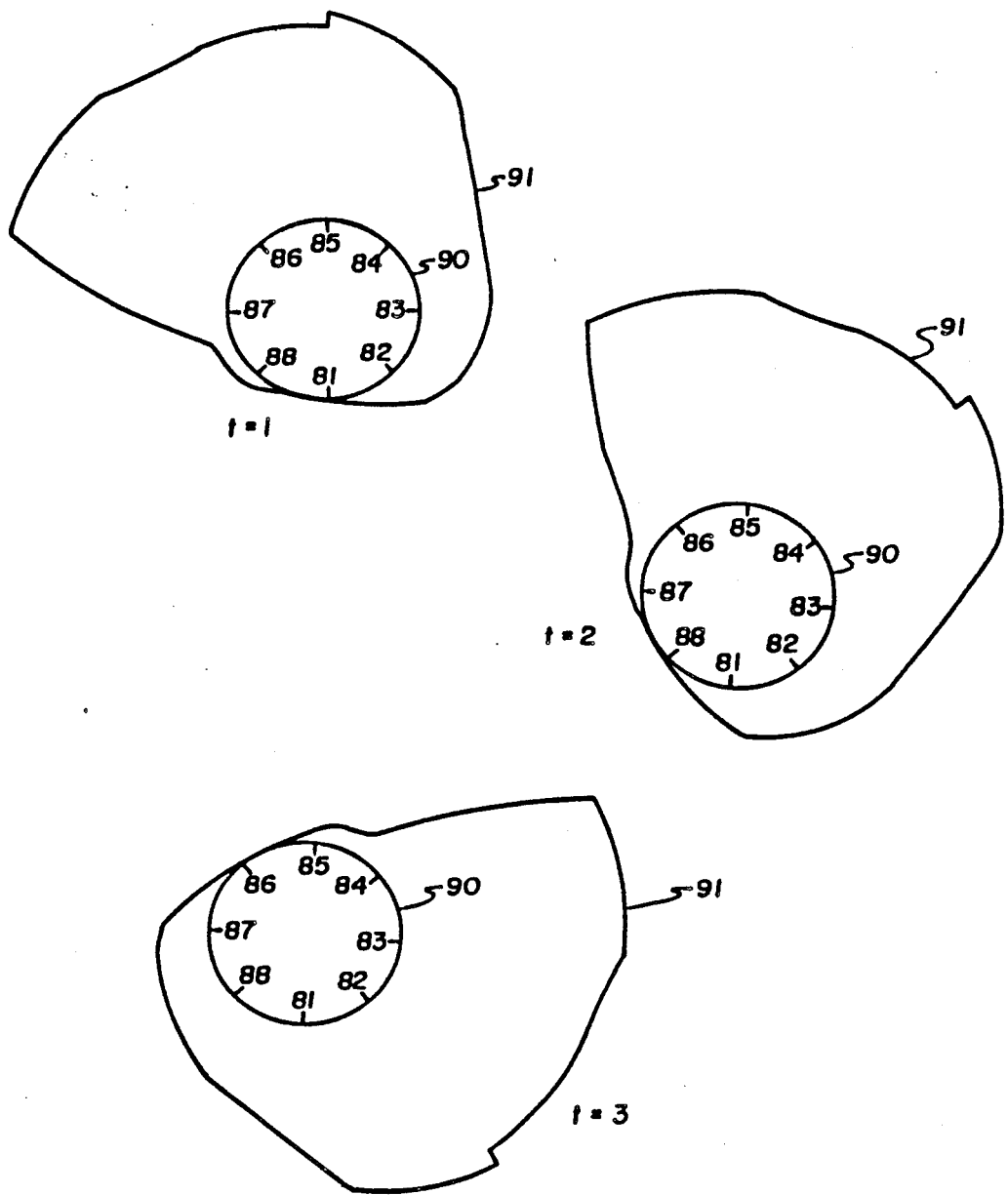
FIG. 4 includes a series of diagrammatic illustrations similar to that of FIG. 3, showing the migration of the waveform of FIG. 3 along a closed loop circulation pathway over time.
Figure 5:
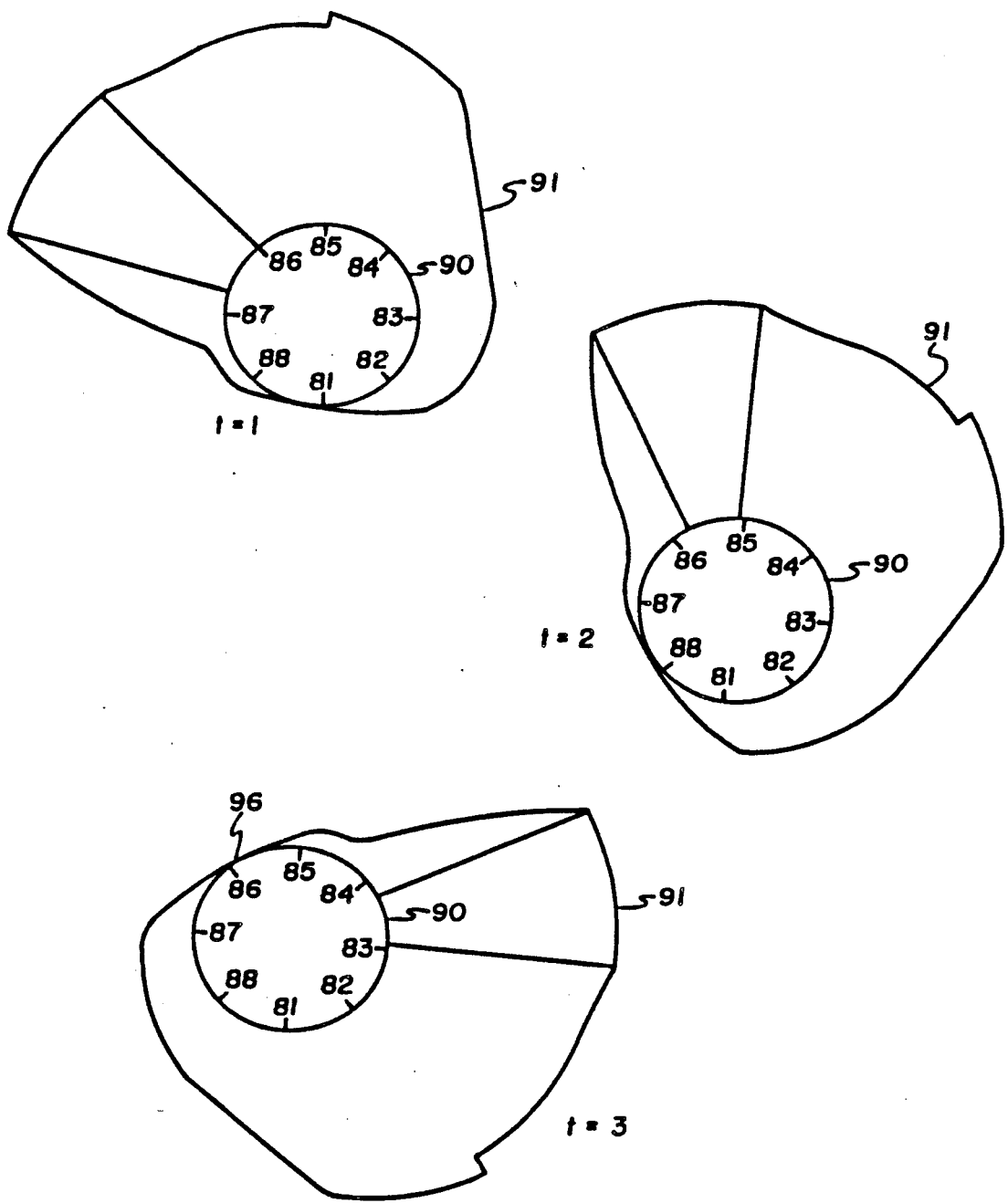
FIG. 5 is similar to FIG. 4 but illustrates the presence and location of a contraction phase within the waveform.

FIGS. 3 through 5 illustrate the practice of this invention as applied to a simulated bed process of the type shown by FIG. 2.

Example III

FIG. 3 is illustrative of the percent dry substance waveform which developed within a simulated moving bed system configured to demonstrate the invention. Points labeled 81 through 88 represent eight stationary points along the circular path 90 of the internal recirculation (I, FIG. 2). The distance between the circle 90 and the plot 91 as measured along the radius 92 represents the percent dissolved solids in the circulating fluid at a specific time at each point in the loop. The positions of the points 81 through 88 have been chosen arbitrarily, but with equal distance between any two neighboring points. In the arrangement of FIG. 2, each point 81 through 88 corresponds to the respective compartments 21 through 28 or associated piping 31 through 38, respectively. The apparatus, which was operated using a sugar beet factory syrup, was characterized as follows:

Number of compartments = 8 (equal volume)
Sorbent = Strong cation ion exchange resin in potassium form, 0.519 cubic feet
Feed Material = Beet molasses, 70 percent dry substance, 61.7 percent sucrose introduced at a flow rate of 33.7 ml/minute
Desorbent = Water introduced at a flow rate of 254 ml/minute
Operating Temperature = 80° C.
Valve Position Shift = 12 minutes
Average Internal Flow Rate = 0.3 bed volumes/hour FIG. 4 illustrates the movement of an equilibrated percent solids waveform such as that illustrated by FIG. 3 along the recirculation pathway 90, chosen at arbitrary but different times, $t=1$, $t=2$, and $t=3$, respectively.

Due to the different sorption characteristics of components, the physical size of the sorbent may also be differentially affected by the separate components. For a fructose-glucose solution operating through a strong cation calcium form resin and with water as the desorbent, the fructose component is more strongly sorbed and the resin bead size decreases as the high fructose portion of the circulating waveform passes through a given section of the simulated moving bed. When the water phase and less sorbed glucose pass through a given section of the simulated moving bed, the resin size expands.

In sugar beet syrup (as used in Example III) or sugar cane syrup applications using strong cation resin in monovalent form and water as desorbent, the highly sorbed sucrose portion of the waveform causes a bead size decrease. The water phase and highly ionic non-sorbed portion of the waveform causes re-expansion of the resin.

The simulated moving bed in these applications can be viewed with respect to a resin bead size waveform circulating through the bed compartments. If the simulated moving bed is configured as separate columns or compartments (resin in each compartment isolated from the resin in other compartments) the system can be viewed as an oscillation of resin bed depth versus time in each of the columns or compartments.

FIG. 5 illustrates a portion of the contraction phase, labeled A, positioned at times $t=1$, $t=2$, and $t=3$ illustrated by FIG. 4, as it rotates around the recirculation pathway 90. The location of this phase at any time can be determined by monitoring the percent solids waveform 91 because the contraction phase occurs in the tail end 95 of the waveform, i.e., in the portion of the waveform which represents the sorbed component(s). The maximum contraction of resin observed in Example III was six percent, measured as an increase in the liquid freeboard above the resin level.

As the contraction phase passes through each individual compartment 21 through 28 of FIG. 2, the liquid in the created void at the top of the bed is displaced by pumping or otherwise drawing in additional sorbent resin into the created void area. For example, referring to FIG. 2, slurried resin may be pumped from the tank T through the sorbent manifolds S. The liquid phase of the slurry exits out of the compartment distributors and is recovered through the manifold R. Bed packing is thus carried out during normal production without use of special reagents or off-line routines.

As best illustrated by FIG. 5, at $t=1$, the contraction phase A is approaching position 86, which may be assumed to correspond to the pipe 36 entering the compartment 26 of FIG. 2. At $t=2$, the contraction phase A has moved past the compartment 26 and is entering compartment 25 (position 85, FIG. 5) and slurried resin may be pumped from the tank T through valve 56 and pipe 46 to the top of compartment 26, the excess liquid being displaced through the pipes 76 and 70. At t=3, the desorbent portion 96 of the waveform 91 is shown in contact with position 86, indicating that desorbent has passed o is passing through the compartment 26, thereby causing expansion of the resin bed.

Reference herein to details of the illustrated embodiments is not intended to limit the scope of the appended claims which themselves recite the features regarded as important to the invention.

I claim:

1. In a simulated moving bed process in which a plurality of sorbent beds are contained within respective vessels with inlets and outlets connected in a loop so that circulating liquid moves in sequence through said beds while process input streams are cyclically introduced in corresponding sequence to said loop at selected locations associated with said vessels, and compensating process output streams are withdrawn in similarly corresponding sequence from said loop at other selected locations associated with said vessels, all while maintaining a forward flow in a fixed direction through the loop during a plurality of cycles, the improvement which comprises:

operating said simulated moving bed process to establish an equilibrated percent solids waveform whereby a contraction phase continuously moves through said loop;

monitoring the position of said contraction phase in said loop over time; and introducing sorbent to a selected sorbent bed following the passage of said contraction phase therethrough while maintaining said forward flow through said loop.

2. The improvement according to claim 1, wherein said circulating liquid includes a discrete contraction phase followed by a discrete desorbent phase, said contraction and desorbent phases flowing in sequence through said selected bed, and sorbent is added to said selected bed during the interval of time between contact of said selected bed by said respective discrete phases.

3. The improvement according to claim 2, wherein sorbent is added in slurry form, the liquid phase of said slurry being similar in composition to said contraction phase.

4. The improvement according to claim 2, wherein each sorbent bed is contained within a separate compartment, and sorbent is added to said selected bed by introducing sorbent to the top of the compartment containing said selected bed.

5. The improvement according to claim 4, wherein sorbent is added in turn to each of said plurality of sorbent beds in sequence, following the contact of each said bed in turn by said contraction phase.

6. The improvement according to claim 5, wherein sorbent is added to each said sorbent bed in the form of a slurry, the liquid phase of said slurry being similar to the composition of said contraction phase, a distributor is provided at the top of each said compartment, and excess liquid resulting from the introduction of said slurry is displaced through said distributor for recovery external said loop.

* * * * *